June 30, 1925.

H. C. EDDY 1,544,528

ELECTRICAL DEHYDRATOR FOR PETROLEUM EMULSIONS

Filed Oct. 19, 1923    2 Sheets-Sheet 1

INVENTOR:
Harold C. Eddy,
By
Graham + Davis
ATTORNEYS.

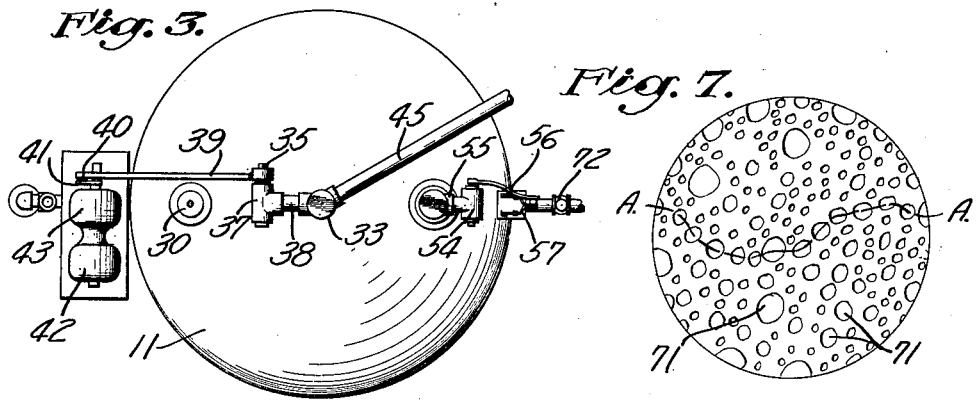
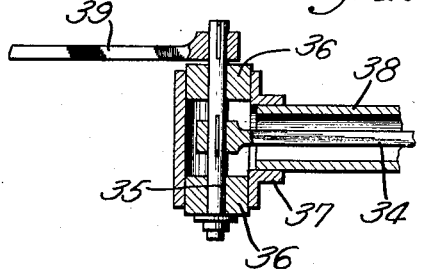
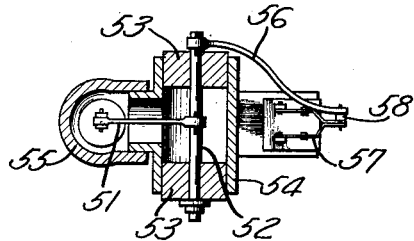
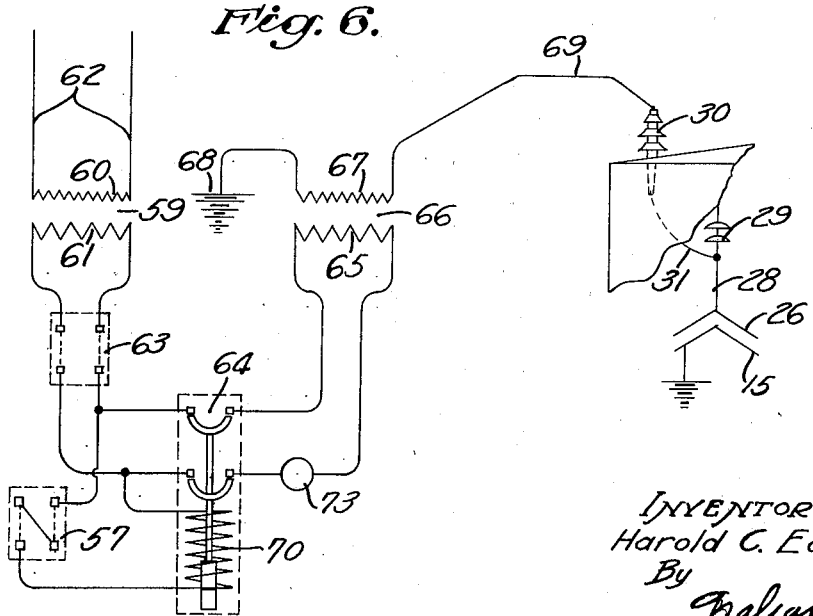

Patented June 30, 1925.

1,544,528

UNITED STATES PATENT OFFICE.

HAROLD C. EDDY, OF LOS ANGELES, CALIFORNIA, ASSIGNOR TO PETROLEUM RECTIFYING COMPANY OF CALIFORNIA, OF LOS ANGELES, CALIFORNIA, A CORPORATION OF CALIFORNIA.

ELECTRICAL DEHYDRATOR FOR PETROLEUM EMULSIONS.

Application filed October 19, 1923. Serial No. 669,593.

*To all whom it may concern:*

Be it known that I, HAROLD C. EDDY, a citizen of the United States, residing at Los Angeles, in the county of Los Angeles, State of California, have invented a new and useful Electrical Dehydrator for Petroleum Emulsions, of which the following is a specification.

The invention relates to the art of separating water and oil from petroleum emulsions.

In the production and transportation of crude petroleum, and its products, water often becomes mixed with the oil. Ordinarily the oil is of considerably lower specific gravity than the water, and the water, unless present in a very finely divided condition, readily settles out of the oil if allowed to stand quiescent in suitable tanks. Emulsion which contains coarse or free water particles may, therefore, be readily separated into its constituent elements by merely allowing it to stand in a tank for a sufficient time to allow the water to settle to the bottom of the tank and the oil to rise to the top.

Emulsions are, however, sometimes produced in which the constituents are so finely divided and intimately mixed that ordinary gravitational separation is not commercially feasible. In such emulsions the water is usually suspended in the oil in the form of minute droplets or particles and these particles show very little tendency to settle downwardly through the oil.

It has been found, however, when a sufficient electromotive force is applied to a body of emulsion having these fine water particles therein that these particles are drawn together by electrostatic attraction and coalesce into larger drops which are of sufficient size to readily settle under the influence of gravity. The herein described invention operates upon this principle and readily separates a petroleum emulsion into free water and clean oil. While it is probable that the amount of water in the cleaned oil leaving the apparatus may be reduced to any desired proportion, it is usually commercially satisfactory to reduce the water content below two per cent (2%) of the total oil cleaned.

While I have described my invention as applied to petroleum oils, it is also equally applicable to other mineral and vegetable oils.

In petroleum, and other emulsions, in addition to the water there is often present other foreign matter such as fine silt or clay particles. By my invention most of these particles may be drawn into suspension with the water and removed therewith.

The agglomerated water, formed by the coalescence of the small water particles, moves downwardly in the electric field due to gravity. Since, in the present invention, one electrode is above the other, this settling of the water tends to concentrate the water in the lower portion of the electric field or just above the lower electrode. To prevent the water concentration in the electric field from becoming too great, it is an object of the invention to so shape and slope the lower electrode that the agglomerated water tends to run off, which can readily be accomplished by making this electrode conoidal.

It has been found that, in treating certain emulsions, persistent short-circuiting water chains or paths tend to form between the electrodes, these chains greatly interfering with the successful operation of the apparatus, and it is an object of the invention to prevent the persistence of such chains or paths by slowly moving the emulsions between the electrodes which can conveniently be accomplished by a periodic and continual movement of the upper electrode.

I have found also that by properly shaping the upper electrode, I can provide a pocket in which dehydrated oil collects, this oil having been dehydrated in the electric field and caught and retained in the pocket due to its lower specific gravity and tendency to rise through the heavier emulsion. This oil, by forming a layer of high dielectric strength, also resists puncture by the electric current and helps prevent the formation of persistent short-circuiting chains.

Inasmuch as oil vapors, when mixed with air form an explosive mixture which is readily ignited by a disruptive electric discharge or spark, it is an object of the invention to provide a dehydrator from which air is excluded when the apparatus is in operation, thus preventing explosions and fires. For the same reasons, it is an object of the invention to provide means for disconnecting the electric power from the dehydrator in the event that the liquid level therein falls to such a degree as to admit air into the top thereof.

As an additional precaution, it is an object of the invention to so arrange the piping of the dehydrator as to prevent the accidental drainage thereof.

It often happens in the practical operation of electrical dehydrators that free water is delivered directly into the dehydrator. This water is an electric conductor and would, if allowed to flow into the electric field, entirely short-circuit the field and interrupt further treatment. It is a further object of my invention to provide means by which any free water which may enter the apparatus is diverted from the electric field.

Further objects and advantages will be made evident hereinafter.

Referring to the drawings which are for illustrative purposes only,

Fig. 3 is a plan view of the apparatus shown in Fig. 1.

Fig. 4 is a section on a plane represented by the line 4—4 of Fig. 1, on a somewhat larger scale than Fig. 1.

Fig. 5 is a section on a plane represented by the line 5—5 of Fig. 1, on a somewhat larger scale than Fig. 1.

Fig. 6 is a diagram of the electrical connections.

Fig. 7 is a portion of an emulsion as seen under a microscope.

Figure 1:
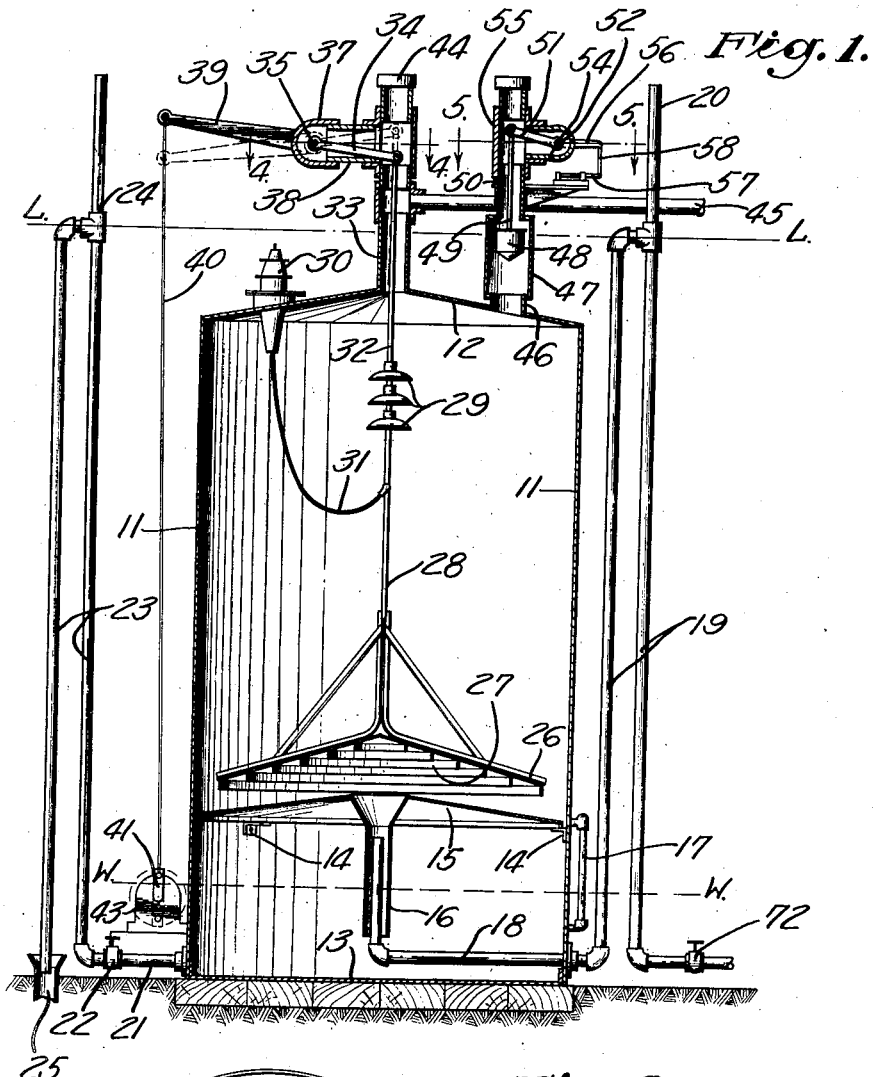
Fig. 1 is a side elevation partly in section of a dehydrator embodying my invention.
Figure 2:
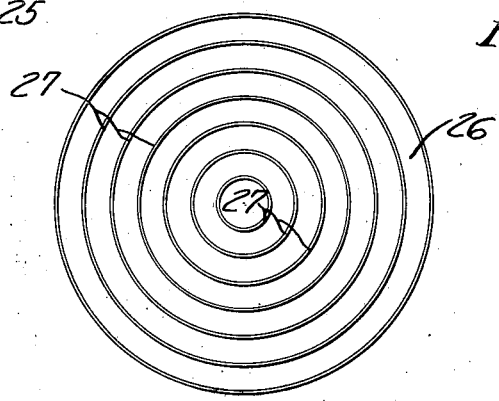
Fig. 2 is a view, on a somewhat larger scale than Fig. 1, of the lower surface of the upper electrode.

In the form of the invention illustrated in these drawings, 11 is a tank having a conical top 12 and a bottom 13. Suspended on brackets 14, fixed to the side of the tank 11, is a lower electrode 15. This electrode has a vertical inlet tube 16 open at the bottom which is joined at its top with a frusto-conical sheet metal member, forming the electrode 15. The tube 16 extends below the operating water plane of the dehydrator which may be maintained at about the line W—W, the height of the water being observed in a gauge glass 17. A water inlet pipe 18 extends up into the tube 16, this water inlet pipe being extended up outside the dehydrator to form a loop 19 whose high point is on a line L—L slightly above the apex of the top 12. Since free water is heavier than the emulsion any water passing into the tank 11 through the pipe 18 tends to immediately sink through the pipe 16 into the body of water in the bottom of the tank 11. This prevents this water from passing into the electric field and short-circuiting it. The high point of the loop 19 is vented to the open air (to prevent siphoning) through a pipe 20 which extends well above the oil outlet pipe of the tank.

A water outlet pipe 21 is provided with a water outlet valve 22 and a loop 23 extending up to the line L—L and vented through a pipe 24 to the outer air. The loop 23 discharges water and any suspended or dissolved solids into a drain 25.

Suspended over the lower electrode 15 is an upper electrode 26 which is also formed of sheet metal fabricated to form a cone. On the lower surface of the upper electrode 26 is a series of dependent concentric skirts 27 formed of sheet metal. The upper electrode is suspended from a rod 28, the upper end of which is attached to the lower end of a series of suspension insulators 29. Electric current is conducted into the interior of the dehydrator through the top 12 through a hollow insulating bushing 30 and delivered to the rod 28 and the upper electrode 26 by means of a flexible conductor 31.

The upper end of the suspension insulators 29 is attached to a rod 32 which passes upwardly through a central pipe 33 and is attached to a lever arm 34 secured to a shaft 35, as shown in plan in Fig. 4. The shaft 35 is journaled in plugs 36 carried in a tee 37 screwed on a nipple 38 which projects from the pipe 33. One end of the shaft 35 has a lever 39 secured thereon, this lever extending outwardly, the outer end thereof having a connection rod 40 pivoted thereto. The connection rod 40 extends down and is pivoted to a crank 41, driven by a motor 42, through suitable speed reducing gearing carried in a case 43. The speed of the motor 42 and the gearing 43 should be so selected as to turn the crank 41 something less than thirty revolutions per minute. The top of the pipe 33 is closed by a cap 44. An oil outlet pipe 45 is connected into the pipe 33, preferably below the nipple 38, and oil and gas are thereby withdrawn from the extreme top of the apparatus.

Connected to the upper part of the apparatus through a nipple 46 is a float chamber 47, in which a float 48 is suspended by means of a rod 49. The rod 49 passes upwardly through a pipe 50 and is pivoted to a lever 51 secured on a shaft 52, as shown in plan view in Fig. 5. The shaft 52 turns freely in plugs 53 threaded in a tee 54, which is secured to a tee 55, forming a portion of the pipe 50. A lever 56 is secured to an outer end of the shaft 52, this lever opening a switch 57 through a rod 58, when the float 48 falls.

The method of electrically connecting the apparatus is shown in Fig. 6, in which 59 is an alternating current transformer having a primary winding 60 and a secondary winding 61. The primary winding 60 is connected through wires 62 with any convenient source of power at any commercial voltage. The ratio of the transformer 59 is such that an electric current at 110 volts is supplied to the terminals of a manually operated switch or automatic circuit breaker 63. The current then flows through an electrically operated switch 64 to the primary 65 of a second transformer 66. The ratio of the second transformer 66 is such that a high electrical potential, 11,000 volts for example, is generated in a secondary 67 thereof. One terminal of the secondary 67 is grounded as shown at 68, or it may be connected to the tank 11. The other terminal 69 of the secondary 67 is connected to a conductor passing downwardly through the insulator 30 and thus through the flexible conductor 31, and the rod 28, impressing a potential between the electrodes 15 and 26.

The electrically operated switch 64 is operated by a coil 70 which is energized from the secondary 61 of the transformer 59 through the switch 57. Whenever this switch is opened by the lowering of the float 48 in the float chamber 47, the electrical circuit to the coil 70 is opened and the switch 64 opens by gravity, thus opening the electrical circuit to the transformer 66. When this occurs, no current flows in the transformer 66 and there is no electrical potential between the electrodes 15 and 26.

The method of operation is as follows:

The tank 11 being empty, the float 48 is in its lowest position and the switch 57 is open so that there is no electrical potential in the tank 11. Emulsion is then delivered to the tank through the pipe 18. The valve 22 is closed.

As soon as the oil entirely fills the tank 11, the float 48 rises and closes the switch 57, thus closing the switch 64 and impressing an electrical potential between the electrodes 15 and 26. This potential acts on the emulsion, as shown in Fig. 7. At this time a valve 72 in the pipe 18 may be closed, thus shutting off the flow of emulsion into the treater. It will be seen that the water particles 71 are of various sizes and are irregularly disposed in the field. Due to the electric field, the particles tend to arrange themselves in chains, which extend between the electrodes, and tend to form a multiplicity of conducting paths. For example, a chain may be formed along the line A—A of Fig. 7. To prevent the persistence of these chains, it may be necessary to agitate the emulsion which is readily accomplished by starting the motor 42. This turns the crank 41 through the speed reducing gears in the case 43, and oscillates the lever 39 through the connecting rod 40. The movement of the lever 39 raises and lowers the upper electrode 26.

The action of the electric field on the emulsion pulls together the fine particles of water 71 to form large masses which settle out of the space between the electrodes 15 and 26. This water falls on the sloping surface of the lower electrode and runs down into the bottom of the tank 11. At the same time the cleaned oil, being lighter than the emulsion, collects in the pocket formed by the upper electrode 26 and, overflowing over the edges of this electrode, rises to the top of the tank. Emulsion then flows into the space between the electrodes to replace the water and oil so removed.

As the dehydration of the emulsion continues, the electrical resistance thereof increases and the amount of current flowing to the transformer 66 decreases. When the oil is substantially dehydrated, the amount of this current as indicated by an ammeter 73 becomes quite small as compared with its original value. Whenever this occurs, the valve 72 may be opened and the emulsion allowed to flow continuously into the tank 11, thus displacing the dehydrated oil which flows from the extreme top of the tank through the pipe 45 into suitable storage tanks, not shown.

As soon as enough water accumulates in the bottom of the tank to be visible in the gauge glass 17, the valve 22 may be opened and water allowed to flow into the drain 25. This water takes with it the precipitated silt and other foreign matter. If the emulsion flows into the tank at a uniform rate and if the amount of water carried by the emulsion is uniform which is usually the case, the precipitation of water into the bottom of the tank is also uniform and the valve 22 can be set by trial to maintain the water at about the level W—W.

When applied to the treatment of many emulsions, it is possible to discontinue agitation as soon as the tank full of oil is once dehydrated, and the motor 42 may then be disconnected from its source of power.

It will be seen that since the loops 23 and 79 extend up to the level L—L, even if both valves 22 and 72 are wide open, the tank cannot be drained through either the pipe 21 or the pipe 18, flow through either pipe ceasing as soon as the level of the oil falls to the line L—L.

Should the liquid level ever accidentally fall below the line L—L, however, due, for example, to a leaky tank or pipe connection, the float 48 will promptly cut off the electric current from the tank by opening the switch 57, and thus prevent an explosion due to ignition of the gas pocket so formed in the top of the tank.

The arrangement of the loops 23 and 79 also provides means for keeping the tank full of cleaned oil at all times and thus making it unnecessary to go through any preliminary cleaning when starting up again.

I claim as my invention:

1. A dehydrator for electrically separating water and oil from an emulsified mixture of said water and oil comprising: a cylindrical tank; an upper electrode in said tank; a lower electrode in said tank, said lower electrode being conical in shape, sloping downwardly from the center thereof; an emulsion inlet pipe so placed as to deliver emulsion to the space between said electrodes near the center thereof; a water outlet pipe so placed as to draw water from the bottom of said tank; an oil outlet pipe so placed as to draw oil from the top of said tank; and means for impressing a sufficient electromotive force between said electrodes to cause a coalescence of water particles in the space between said electrodes.

2. A dehydrator as in claim 1 characterized by the fact that means are provided for periodically varying the distance between said electrodes.

3. A dehydrator as in claim 1 characterized by the fact that the lower electrode is electrically connected to said tank and the emulsion inlet pipe passes centrally upward, delivering emulsion through an opening in said lower electrode.

4. A dehydrator as in claim 1 characterized by the fact that the oil outlet pipe takes oil and gas from the extreme top of said tank and means are provided for interrupting the electric circuit in the event that the liquid in said tank falls to such a degree as to leave a gas space over said liquid in said tank.

5. A dehydrator as in claim 1 characterized by the fact that the water outlet and emulsion inlet pipes are so arranged that fluid will not flow outwardly from the tank therethrough if the liquid in said tank falls to such a degree as to leave a gas space above said liquid in said tank.

6. In a dehydrator, the combination of: a shell; a pair of horizontal electrodes in said shell; means for delivering emulsion into said shell in such a manner as to enter between said electrodes; means for drawing water from said shell; means for drawing treated oil from said shell; means for impressing an electric potential between said electrodes; and means for reciprocating one of said electrodes relative to the other so as to provide a continuous movement of the oil being treated.

7. In a dehydrator, the combination of: a shell; a pair of horizontal electrodes in said shell; means for delivering emulsion into said shell in such a manner as to enter between said electrodes; means for drawing water from said shell; means for drawing treated oil from said shell; means for impressing an electric potential between said electrodes; and means for providing a relative reciprocation of said electrodes so as to provide a continuous movement of the oil being treated.

8. A dehydrator as defined in claim 7, in which the lower of said electrodes is of conical form with the upper surfaces sloping downwardly from a central point.

9. A dehydrator as defined in claim 7, in which the lower of said electrodes is of conical form with the upper surfaces sloping downwardly from a central point, and the upper of said electrodes is in form of a cone inverted over said lower electrode.

10. A dehydrator as defined in claim 7, in which the upper of said electrodes has pockets formed on the under side thereof for retaining dielectric oil.

In testimony whereof, I have hereunto set my hand at Los Angeles, California, this 8th day of October, 1923.

HAROLD C. EDDY.